(12) United States Patent
Thoni et al.

(10) Patent No.: US 11,519,806 B2
(45) Date of Patent: Dec. 6, 2022

(54) SYSTEM AND METHOD FOR INDICATING AIR PRESSURE WITHIN AN ENCLOSED SPACE

(71) Applicant: Johnson Controls Technology Company, Auburn Hills, MI (US)

(72) Inventors: Mark A. Thoni, Pewaukee, WI (US); Ryan J. Bykowski, South Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 176 days.

(21) Appl. No.: 17/108,750

(22) Filed: Dec. 1, 2020

(65) Prior Publication Data

US 2021/0164856 A1     Jun. 3, 2021

Related U.S. Application Data

(60) Provisional application No. 62/942,477, filed on Dec. 2, 2019.

(51) Int. Cl.
| | |
|---|---|
| *G01L 13/02* | (2006.01) |
| *G01L 19/12* | (2006.01) |
| *G01L 7/08* | (2006.01) |

(52) U.S. Cl.
CPC ............. *G01L 19/12* (2013.01); *G01L 7/086* (2013.01); *G01L 13/025* (2013.01)

(58) Field of Classification Search
CPC ......... G01L 19/12; G01L 7/026; G01L 7/086; G01L 7/045; G01L 7/065; G01L 7/106;
(Continued)

(56) References Cited

U.S. PATENT DOCUMENTS

| | | | | |
|---|---|---|---|---|
| 4,287,750 A | * | 9/1981 | Eckstein | .................. G01F 1/34 |
| | | | | 116/270 |
| 4,502,336 A | * | 3/1985 | Dudash | .................. G01L 7/045 |
| | | | | 73/756 |

(Continued)

FOREIGN PATENT DOCUMENTS

| | | | | |
|---|---|---|---|---|
| DE | 4238149 C2 | * | 5/1997 | ............ F24F 11/022 |
| DE | 102016114419 B3 | * | 1/2018 | |

(Continued)

*Primary Examiner* — Herbert K Roberts
(74) *Attorney, Agent, or Firm* — Foley & Lardner LLP

(57) ABSTRACT

A system and method for sensing and indicating air pressure within an enclosed space is described. The system comprises a pressure sensing device and pressure indicator further comprising a housing enabled to house a plurality of electronic devices and having an opening, an elastomeric membrane covering the opening of the housing and capable of flexing inwards and outwards, a light emitting device to provide an illumination and a projector for projecting a positive pressure symbol and a negative pressure symbol. The elastomeric membrane flexes inwards along with a representation of the positive pressure symbol with an illumination of a first color when the pressure within the enclosed space is positive and the elastomeric membrane flexes outwards along with a representation of the negative pressure symbol with the illumination of a second color when the pressure within the enclosed space is negative.

20 Claims, 5 Drawing Sheets

(58) Field of Classification Search
CPC . G01L 7/187; G01L 23/06; G01L 3/08; G01L 5/0071; G01L 5/047; G01L 13/025
See application file for complete search history.

(56) References Cited

U.S. PATENT DOCUMENTS

| | | | | |
|---|---|---|---|---|
| 4,823,727 | A * | 4/1989 | Baggett | G01L 19/12 |
| | | | | 116/272 |
| 5,689,107 | A * | 11/1997 | Hsu | G01L 23/16 |
| | | | | 356/618 |
| 6,817,311 | B1 * | 11/2004 | Treen | A63B 41/00 |
| | | | | 116/270 |
| 9,824,549 | B2 * | 11/2017 | Taylor, Jr. | G08B 5/36 |
| 10,655,881 | B2 | 5/2020 | Sinha et al. | |
| 2004/0025581 | A1 * | 2/2004 | Miller | G01L 19/12 |
| | | | | 73/146 |
| 2004/0261534 | A1 * | 12/2004 | Boukhny | G01L 9/0076 |
| | | | | 73/705 |
| 2006/0118032 | A1 * | 6/2006 | Rasmussen | G01L 19/08 |
| | | | | 116/270 |
| 2009/0126482 | A1 * | 5/2009 | Fundak | B63C 11/02 |
| | | | | 340/612 |
| 2010/0116564 | A1 * | 5/2010 | Silverbrook | B42C 9/0081 |
| | | | | 178/19.01 |
| 2010/0212579 | A1 * | 8/2010 | Satoh | F16L 37/0915 |
| | | | | 116/272 |
| 2011/0253887 | A1 * | 10/2011 | Garfinkle | B65D 90/48 |
| | | | | 250/281 |
| 2012/0247791 | A1 * | 10/2012 | Kuczek | A62C 13/62 |
| | | | | 169/23 |
| 2014/0230824 | A1 * | 8/2014 | Lucchina | A61M 16/0409 |
| | | | | 128/207.15 |
| 2018/0113512 | A1 * | 4/2018 | Kang | G06F 3/04817 |
| 2019/0054780 | A1 * | 2/2019 | Nichols | B60C 23/0494 |
| 2019/0091872 | A1 * | 3/2019 | Alspach | B25J 9/1633 |
| 2019/0340913 | A1 * | 11/2019 | Downs | G08B 5/36 |
| 2021/0051808 | A1 * | 2/2021 | Moon | H04M 1/026 |

FOREIGN PATENT DOCUMENTS

| | | | |
|---|---|---|---|
| JP | 2005114317 A | * | 4/2005 |
| KR | 100525510 B1 | * | 11/2005 |
| KR | 20110026194 A | * | 3/2011 |

\* cited by examiner

SYSTEM AND METHOD FOR INDICATING AIR PRESSURE WITHIN AN ENCLOSED SPACE

CROSS-REFERENCE TO RELATED PATENT APPLICATION

This application claims the benefit of and priority to U.S. Provisional Patent Application No. 62/942,477, filed Dec. 2, 2019, the entirety of which is incorporated by reference herein.

BACKGROUND

The present disclosure relates generally to a system for and method of sensing and indicating air pressure within an enclosed space by usage of a pressure sensing device and pressure indicator.

A pressure sensing device is often used in enclosed spaces or rooms like hospital rooms, operating rooms, laboratories, integrated circuit (IC) fabrication rooms, or any other room or building where there is a requirement of a specific pressure requirement like a positive pressure state or a negative pressure state with respect to atmospheric pressure or pressure in a neighboring room. The pressure sensing device is usually an internal electronic or pneumatic sensor that is enclosed in a housing and not viewable by the user.

Conventional digital pressure sensors in the market are often not trusted by doctors, engineers, scientists or the person who needs to observe the pressure parameter in the room or space in which the person is present due to reliability issues.

Firstly, the current pressure sensing devices are not reliable all the times because they lack a fixed level of validity and some of the devices of a batch often get damaged immediately after implementation and usage and further resulting in a non-working state or damaged state.

Secondly, current pressure sensing devices often fail to provide the pressure state of the room (positive or negative state) in a quick manner and in a manner readily ascertained form a distance.

SUMMARY

One implementation of the present disclosure is a system for sensing air pressure and indication of the air pressure within an enclosed space. The system may further include a pressure sensing device and pressure indicator. The pressure sensing device and pressure indicator may further comprise a housing enabled to house electronic devices and having an opening. The pressure sensing device and pressure indicator may further include an elastomeric membrane covering the opening of the housing and capable of flexing inwards and outwards during a pressure change of the enclosed space from a neutral air pressure. The pressure sensing device and pressure indicator may further include a light emitting diode array placed within the housing to provide an illumination for a positive pressure with a first color and for a negative pressure with a second color. The pressure sensing device and pressure indicator may further include a projector housed within the housing for projecting a positive pressure symbol and a negative pressure symbol. An elastomeric membrane flexes inwards along with the representation of the positive pressure symbol with the illumination of the first color when the pressure within the enclosed space is positive and the elastomeric membrane flexes outwards along with the representation of the negative pressure symbol with the illumination of the second color when the pressure within the enclosed space is negative in some embodiments.

In some embodiments, the housing is made from one of the materials comprising metals, glasses and plastics.

In some embodiments, the electronic devices comprise a digital pressure sensor for measuring the pressure within the enclosed space and a speaker for reading out the measured pressure within the enclosed space.

In some embodiments, the elastomeric membrane flexes due to pressure difference between the enclosed space and the material of the elastomeric membrane is selected based on a particular pressure threshold.

In some embodiments, elastomeric membrane is made from a translucent material.

In some embodiments, the positive pressure symbol comprises either of a plus mark, a tick mark, a thumbs up symbol, and arrow up symbol, a letter P, etc.

In some embodiments, the negative pressure symbol comprise either of a minus mark, an X mark, a letter N, a thumbs down symbol, and arrow down symbol, etc.

In some embodiments, the elastomeric membrane remains in a non-flexed position when the pressure within the enclosed space is neutral.

Another implementation of the present disclosure is a pressure sensing and indicating method for an enclosed space. The method may include sensing the pressure with a pressure sensing device and pressure indicator within the enclosed space and reading out the pressure. The method may further include flexing an elastomeric membrane held at the opening of a housing of the pressure sensing device to inward directions for a positive pressure state of the enclosed space and to outward direction for a negative pressure state of the enclosed space. The method may further include illuminating the elastomeric membrane by a first color for the positive pressure state and by a second color for the negative pressure state. The method may further include projecting, on the elastomeric membrane, a positive pressure symbol for the positive pressure state and a negative pressure symbol for the negative pressure state within the enclosed space.

BRIEF DESCRIPTION OF THE DRAWINGS

The exemplary embodiments will become more fully understood from the following detailed description, taken in conjunction with the accompanying drawings, wherein like reference numerals refer to like elements, in which.

DETAILED DESCRIPTION

Overview

Referring generally to the FIGURES, a system for and method of sensing and indicating air pressure within an enclosed space is described according to some embodiments. In some embodiments, the system and method provides a pressure indication using the flexing of an elastomeric membrane inwards and outwards. In some embodiments, the system and methods provides a readily understandable state of pressure within a room (positive or negative) by observing as compared to knowing the pressure state by reading or hearing and an indication of the actual pressure (text display, graph display, etc.) The system includes a pressure sensing device and pressure indicator which may have an arrangement of an elastomeric membrane which can flex inwards and outwards with respect to pressure change either to positive state, negative state or to a neutral state within the enclosed space in some embodiments. The flexing of the elastomeric membrane is further accompanied with illumination by lights with different colors for positive and negative pressure state in some embodiments. In addition to flexing and illumination, a pressure state indication is further accompanied by projection of positive and negative symbols by a projector in some embodiments.

Some embodiments of the systems and methods provide a representation of positive or negative state of a room along with digital read out because operators are keen on knowing the pressure state of a room to be in a positive state or a negative state as compared to knowing the value. For example, a scientist or an engineer working in a laboratory requires to know the pressure state of the laboratory to be above a threshold value or below a threshold value instead of knowing a value of pressure. The systems and methods advantageously help the room operators be aware of the pressure state of a room or enclosed space (e.g., in a positive state or a negative state) by observing and further by displaying or reading out the accurate pressure parameter of the enclosed space in some embodiments.

Exemplary embodiments of systems for and methods of sensing and indicating pressure within the enclosed space is further explained in detail with the aid of the figures accompanying the description of the present disclosure.

Figure 1:
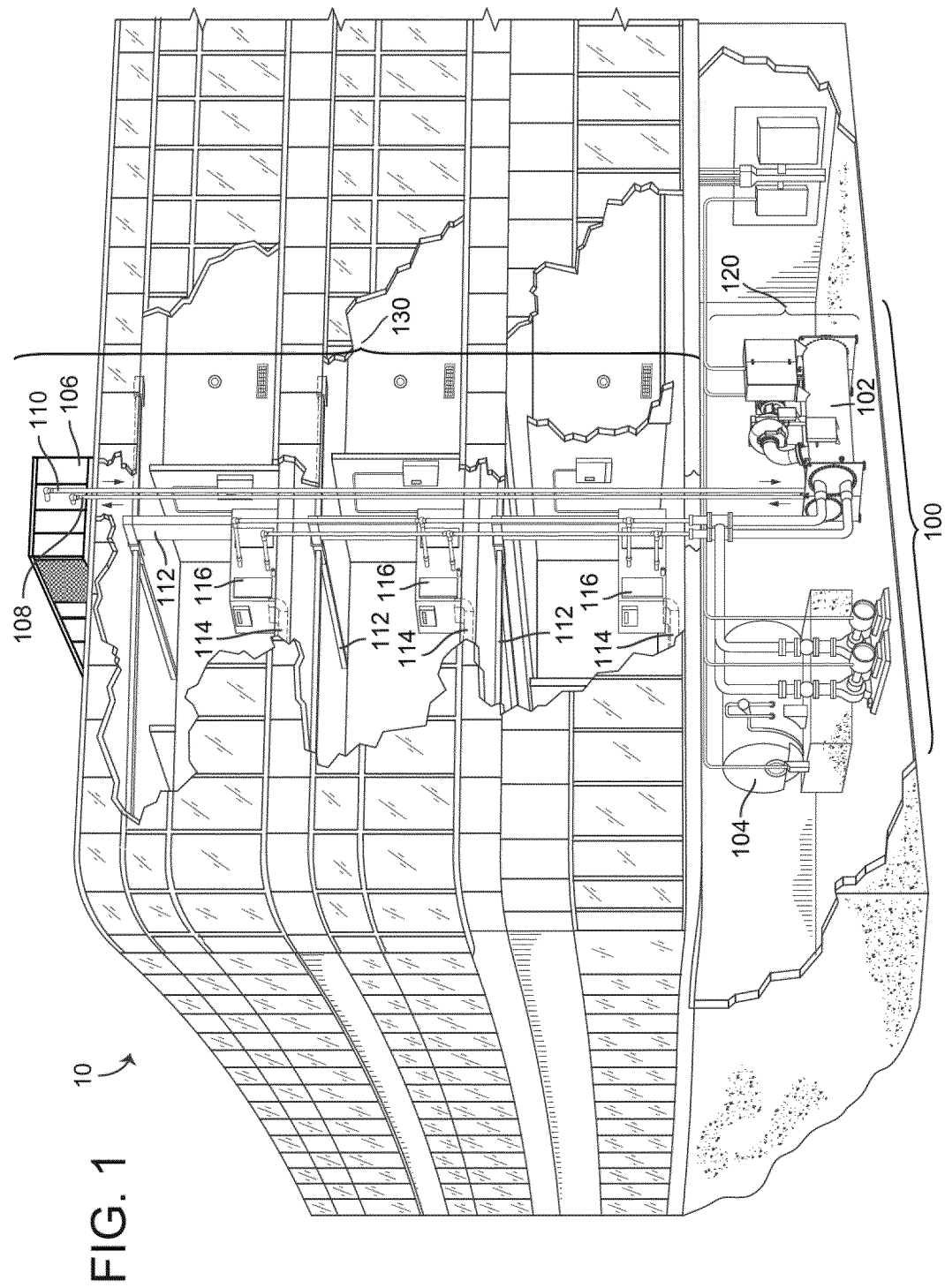
FIG. 1 is a perspective view schematic drawing of a building, according to an exemplary embodiment.

Referring now to FIG. 1, a perspective view of a building 10 is shown, according to an exemplary embodiment. The building may be a laboratory, a hospital, an office, a shopping center, a hotel, a car parking area, a fabrication facility, a plant, or any structure having multiple levels and/or zones wherein air flow and/or air pressure are managed from one point to another point within a building.

The building may further include a number of levels or floors, wherein each floor may further include one or more zones and each zone may further include one or more units. The floors, zones or units of the building may be labelled with location indicators. Each floor, zone and units may relate to an enclosed space and can be maintained in a desired pressure state as per the user. The desired pressure state may be maintain with respect to a reference point or a reference value. The pressure state may be maintained by knowing the pressure and further controlling the air supply and exhaust.

Figure 2:
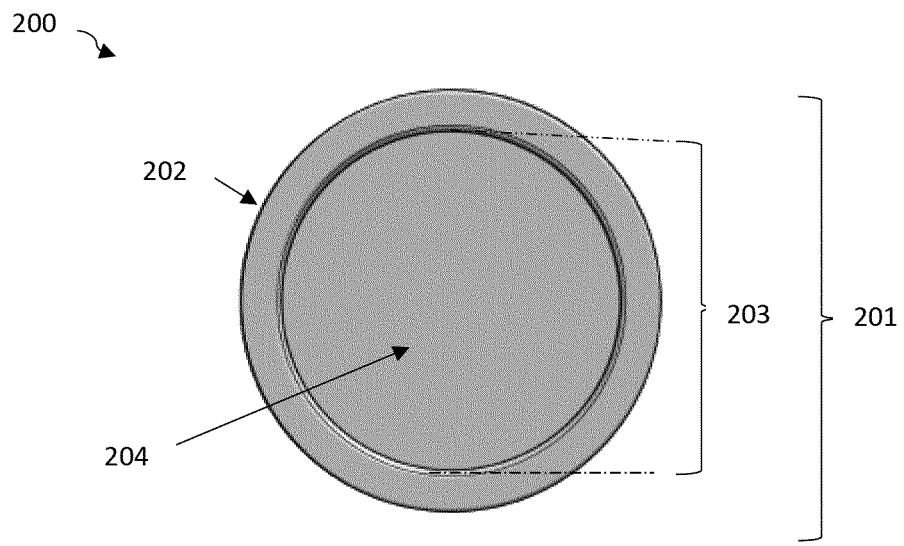
FIG. 2 is a front view planar schematic drawing of a pressure sensing and indicating system for use in the building illustrated in FIG. 1, according to an exemplary embodiment.
Figure 7:
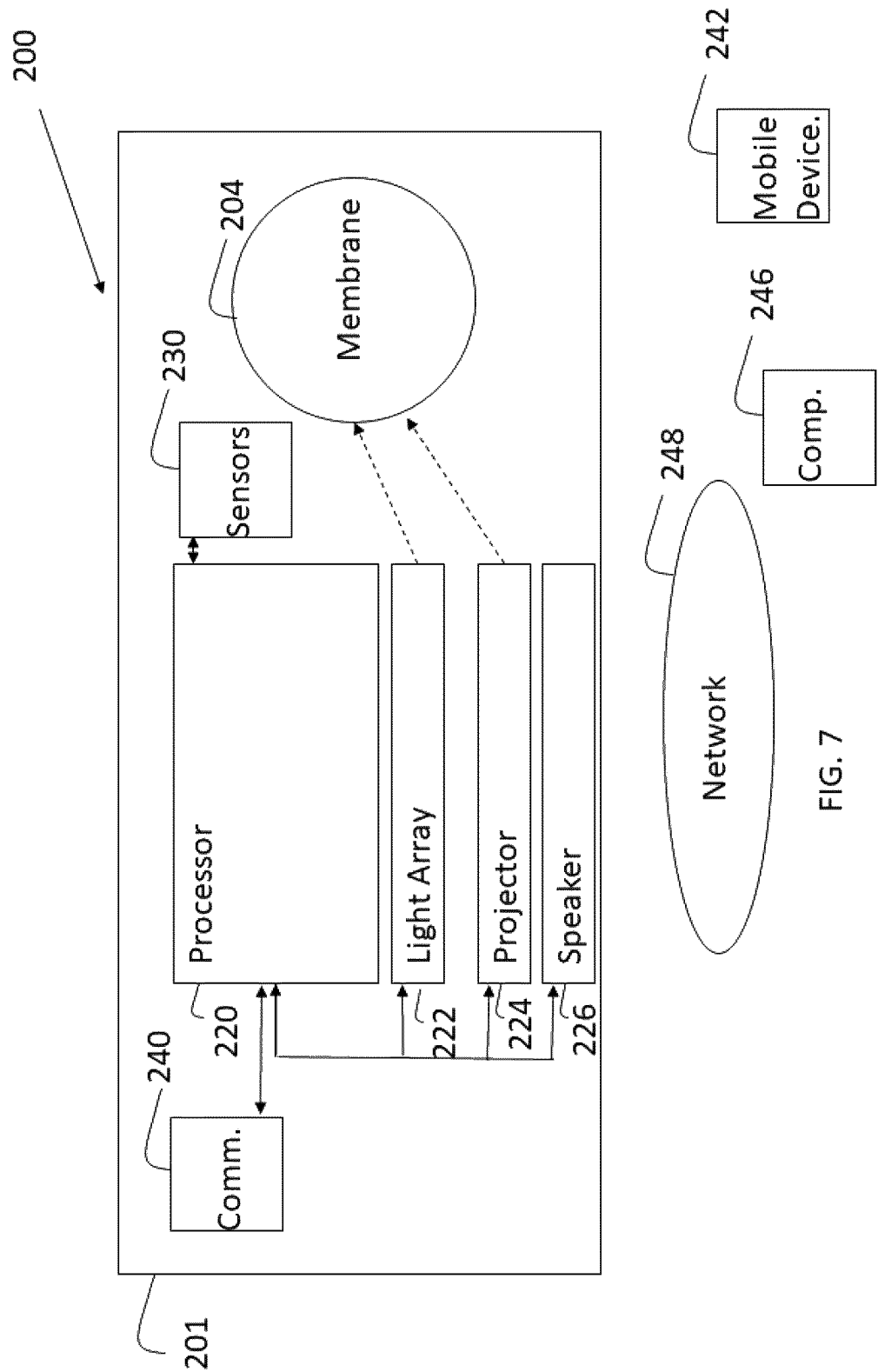
FIG. 7 is a general block diagram of the pressure sensing and indicating system for illustrated in FIG. 2, according to an exemplary embodiment.

Referring now to FIGS. 2 and 7, a pressure indicating system 200 includes a pressure sensing device and pressure indicator 201 can be disposed on walls of the building 10 (FIG. 1), according to an exemplary embodiment. In some embodiments, the pressure sensing device and pressure indicator 201 is disposed next to a doorway associated with a room being monitored. The pressure sensing device and pressure indicator 201 is configured to be in pressure communication with the room being monitored via tubes, apertures, or other ports in some embodiments. The pressure sensing device and pressure indicator 201 is configured to in communication with atmospheric pressure or pressure from a neighboring room or other pressure threshold.

The pressure indicating system 200 also includes or is configured to work with one or more of a network 248, a computer 246, and a mobile device 242. The pressure indicating system 200 can be integrated with building devices such as those described with reference to FIG. 1 as well associated networks and the devices described in the patents incorporated herein by reference. The pressure indicating system 200 can utilize halo lighting and data communications as described in U.S. Pat. No. 9,824,549 granted Nov. 21, 2017 and U.S. Pat. No. 10,655,881 granted May 19, 2020, both of which are incorporated herein by reference in their entireties.

Pressure data, alarms, indications of pressure states, operating status, room identification, etc. can be provided from the pressure sensing device and pressure indicator 201 to one or more of the network 248, the computer 246, and the mobile device 242. Other environmental data and alarms using humidity data, temperature data, and air quality data can be communicated. The data is sent periodically for storage in historical databases and is provided in response to events and malfunctions (unexpected increase or drop in pressure) in some embodiments. For example, the network 248, the computer 246, and/or mobile device 242 can query the pressure sensing device and pressure indicator 201 when routines or operations are scheduled for the room to provide an indication of pressure state to users. The queries can be automatically issued and provided in a period before the routine start time (e.g., 5 minutes before) using scheduling software associated with the room in some embodiments. In some embodiments, the schedule for the room is stored in or accessible by the pressure sensing device and pressure indicator 201 and the pressure data and alarms are sent to network 248, the computer 246, and/or mobile device 242 when the room is about to be used and during use. The mobile device 242 can be a smart phone with an app configured to query and receive pressure warnings and pressure data from the pressure sensing device and pressure indicator 201 in some embodiments.

The pressure sensing device and pressure indicator 201 is configured to indicate whether the pressure within an enclosed space is either in a positive state, negative state or in a neutral state as compared to the atmospheric pressure, pressure in another room, and or another threshold. In an embodiment, the enclosed space may be a hospital room, an operation theatre, a laboratory, a kitchen or any room where there is requirement of a pressure indication in either of the positive state, the negative state and/or the neutral state.

The pressure sensing device and pressure indicator 201 includes a housing 202, an opening 203, an elastomeric membrane 204 and a number (e.g., one or more) electronic devices in some embodiments. In some embodiments, the electronic devices include a light array 222, a projector 224, a speaker 226, sensors 230 (e.g., a digital pressure sensor, temperature sensor, humidity sensor, air quality sensor, etc.), and a communication circuit 240.

The housing 202 is manufactured by casting method and by injection molding wherein the material may be any one of a plastic, a metal, an alloy or composites in some embodiments. Although shown in FIG. 2 as a cylindrical housing with a circular membrane 204, housing 202 and membrane 204 can have a variety of shapes including but not limited to rectangular, square, octagonal, etc.

The housing has an opening 203 which may be closed and covered by the elastomeric membrane 204 in some embodiments. In an embodiment, the elastomeric membrane 204 may be processed or obtained from a material which may allow the membrane to flex easily to minute pressure changes within the enclosed space. In another embodiment, the elastomeric membrane 204 may be a translucent material which is preferably semi-transparent and may allow light to travel from the elastomeric membrane but may not allow clear vision from one side to the other.

The digital pressure sensor is configured to measure the pressure within the enclosed space. This measured pressure is stored by the processor 220 and can be communicated from the speaker 226 in the form of words, audible alarms, etc. The pressure is reported as a pressure state or the measured pressure reading in atmospheres, bar, pounds per square inch (PSI) or other unit in some embodiments. The speaker 226 can be located within the housing 203 or can be an external speaker in the building in some embodiments.

The processor 220 is configured to compare the measured pressure to a threshold to provide alarms or to cause projector 224 to project a state or light array to project a color in some embodiments. In some embodiments, the light form the light array 22 and/or projector 224 is provided to membrane 204 for viewing by occupants.

The projector 224 is configured to project light to provide a positive symbol when the pressure within the enclosed space is positive or to project a negative symbol when the pressure within the enclosed space is negative in some embodiments. In some embodiments, the projector 224 includes optics and a light source for projecting light as described herein. In some embodiments, the light array 222 is the light source for the projector.

The power supplied to the light array 222, projector 224, speaker 226, sensors 230 and communication circuit 240 may be either through mains connection or through batteries. The pressure indicating system 200 can be integrated with, powered by and communicate with lighting systems, building security, and HVAC systems.

Processor 220 is a controller, control circuit, microprocessor or combinations thereof configured to provide some of the operations described herein. Processor is implemented as one or more of a general purpose processor, a specific purpose processor, application specific integrated circuits (ASICs), field programmable gate arrays (FPGAs), groups of processing components, interface, isolation, and filter components, analog and digital support circuits or other suitable electronic processing components. The memory is one or more storage devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor 220 and includes computer code or instruction modules for executing one or more processes described herein. The memory includes various circuits, software engines, and/or modules that cause the one or more processors to execute the systems and methods described herein.

Figure 3:
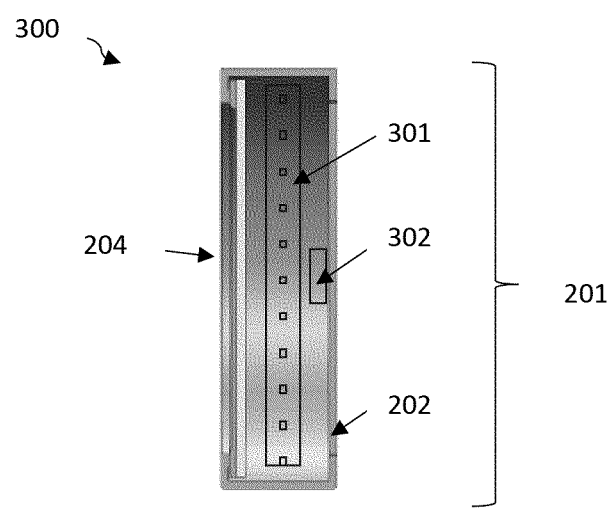
FIG. 3 is a side view planar schematic drawing of pressure sensing and indicating system illustrated in FIG. 2, according to an exemplary embodiment.

Referring now to FIG. 3, the pressure sensing device and pressure indicator 201 is shown, according to an exemplary embodiment. The side view of the pressure sensing device and pressure indicator 201 illustrates the housing 202, the elastomeric membrane 204, the light array 222 embodied as a light emitting diode array 301 and the projector 224 embodied as projector 302 according to some embodiments. The placement of array 301 and projector 302 can vary depending upon design considerations The light emitting diode array 301 may be implemented to illuminate the elastomeric membrane 204. In an embodiment, a specific light color may be assigned to illuminate the pressure sensing device and pressure indicator 201 when the pressure within the enclosed space is positive. Such specific color for positive pressure indication may be referred as first color (e.g., green). Furthermore, another specific light which may be different from first color may be assigned to illuminate the pressure sensing device and pressure indicator 201 when the pressure within the enclosed space is negative. Such specific color for negative pressure indication may be referred as second color (e.g., red).

Figure 4:
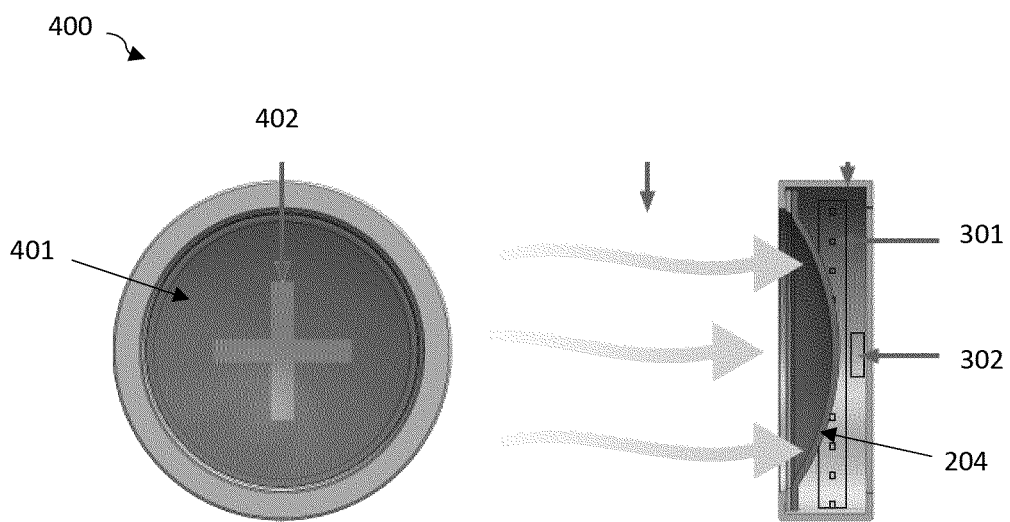
FIG. 4 is a combined view (planar side view and front view) schematic drawing of the pressure sensing and indicating system illustrated in FIG. 2 when the pressure within a room is in a positive state, according to an exemplary embodiment.

The projector 302 may be implemented for projecting positive or negative symbols as per the pressure conditions within the enclosed space as explained in the description of FIG. 2 and FIG. 4. In an embodiment, the icons are projected on the back side of the elastomeric membrane 204. In an embodiment, the projector may preferably be a microprojector which can fit within the housing 202 of the pressure sensing device and pressure indicator 201.

Referring now to FIG. 4, the pressure sensing device and pressure indicator 201 indicates the pressure within a room is in a positive state, according to some embodiments. The implementation and execution of the pressure state indication when the pressure within the enclosed space is in a positive state is with the membrane disposed within the housing 202 in some embodiments. A positive pressure state may generally relate when the pressure within the enclosed space is above a particular predefined threshold. This threshold may be fixed according to the pressure requirement of the enclosed space. Alternatively, the negative and positive pressure state indications can be reversed depending upon which room is to have negative or positive pressure and within which room the housing 202 is disposed.

In an embodiment, when the pressure within the enclosed space exceeds a particular limit or a predefined pressure value then the elastomeric membrane 204 may start flexing inwards and may flex within the housing 202 to indicate the pressure state as positive within the enclosed space.

When the elastomeric membrane flexes inwards, the projector 302 may project a positive symbol 401 and the LED array 301 may illuminate the elastomeric membrane 204 with the first color.

Figure 5:
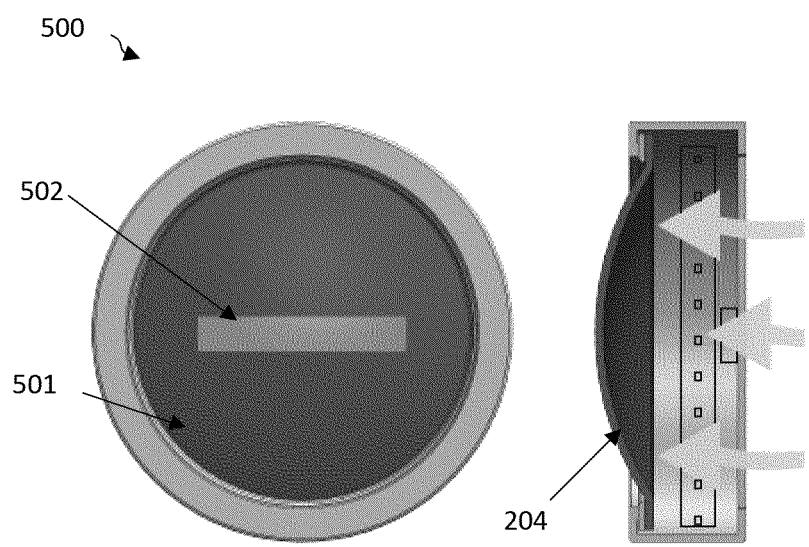
FIG. 5 is a combined view (planar side view and front view) schematic drawing of the pressure sensing and indicating system illustrated in FIG. 2 when the pressure within the room is in a negative state, according to an exemplary embodiment.

Referring now to FIG. 5, the pressure sensing device and pressure indicator 201 indicates when the pressure within a room is in a negative state, according to some embodiments.

The implementation and execution of the pressure state indication when the pressure within the enclosed space is in the negative state is with the membrane 204 extending from the housing 202. A negative pressure state may generally relate when the pressure within the enclosed space is below the particular predefined threshold.

In an embodiment, when the pressure within the enclosed space falls below the particular limit or a predefined pressure value then the elastomeric membrane 204 may start flexing outwards and may flex outside the opening 203 of housing 202 to indicate the pressure state as negative within the enclosed space.

When the elastomeric membrane 204 flexes outwards, the projector 302 may project a negative pressure symbol 502 and the LED array 301 may illuminate the elastomeric membrane 204 with the second color wherein the second color is different from the first color.

In an embodiment, the positive pressure symbol comprises either of a plus mark or a tick mark and the negative pressure symbol comprise either of a minus mark or a cross mark.

Figure 6:
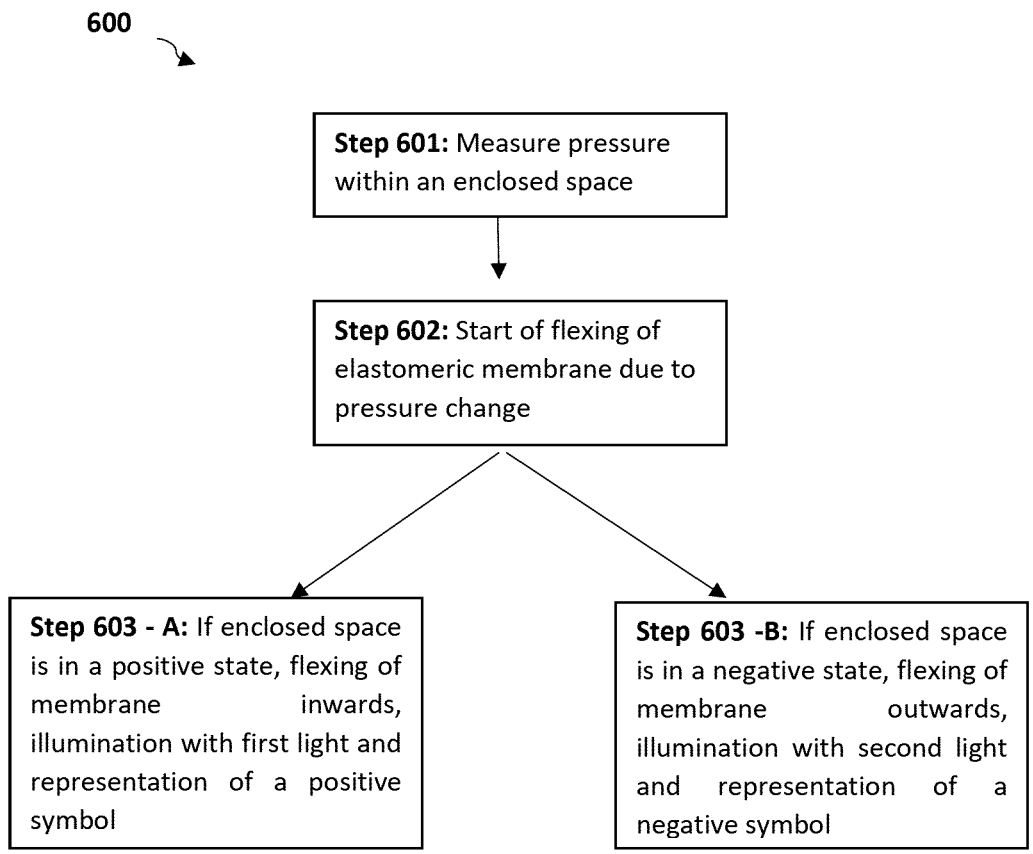
FIG. 6 is a flow diagram of a pressure sensing and indicating method for an enclosed space, according to an exemplary embodiment.

Referring now to FIG. 6, a pressure sensing and indicating method 600 for an enclosed space is shown, according to an exemplary embodiment.

At step 601, the pressure sensing device and pressure indicator 201 present within the enclosed space may sense the pressure present within the enclosed space.

At step, 602, the elastomeric membrane 204 may start to flex inwards or outwards due to the effect of the pressure change within the enclosed space when the pressure changes from a neutral state. The neutral pressure state may relate to a pressure condition of the enclosed space which matches with the predefined range or value of a pressure parameter.

At step 603-A, when the pressure state within the enclosed state is positive, then the elastomeric membrane 204 may flex to inward direction. At the same time, the pressure sensing device and pressure indicator 201 may illuminate the elastomeric membrane 204 by a first color 401 and the projector 302 may represent a positive pressure symbol 402 on the elastomeric membrane 204.

At step 603-B, when the pressure state within the enclosed state is negative, then the elastomeric membrane 204 may flex to outward direction from the opening 203 of the housing 202. At the same time, the pressure sensing device and pressure indicator 201 may illuminate the elastomeric membrane 204 by a second color 501 and the projector 302 may represent a negative symbol 502 on the elastomeric membrane 204.

At step 604, the pressure sensing device and pressure indicator 201 may remain in the same state till the same pressure side is maintained (for example, negative to negative pressure condition) or change when the pressure switches to other state (for example, negative to positive pressure condition).

In an embodiment, the pressure sensing device and pressure indicator 201 may remain in an un-lighted condition, without any representation of a symbol, and the elastomeric membrane 204 in a non-flexed position when the pressure within the enclosed space is in the neutral state.

In yet another embodiment, the pressure sensing device and pressure indicator 101 may also provide a timely read of the pressure value within the enclosed space by referring the digital pressure sensor. The read out may be enabled by the speaker provided in the pressure sensing device and pressure indicator 101.

In yet another embodiment, the material of the elastomeric membrane may be selected as per the requirement of the pressure state which corresponds to flex when the pressure with the enclosed space changes. The material may be selected by considering the stretching or flexing parameters, the correspondence to a particular pressure threshold and with other design requirements.

In an exemplary embodiment, if the first color selected for positive state is yellow color then blue color may be selected for the second color. The color may be selected such that they provide a contrasting effect and the operator or user can easily interpret the pressure conditions of the enclosed space.

In an example, considering the pressure sensing device and pressure indicator 101 is installed within a laboratory which requires a negative pressure state to conduct the experiments or the processes. The operators within the laboratory may refer to the pressure sensing device and pressure indicator 101 to confirm the negative pressure state before starting any experiments or processes within the laboratory. If in case, the pressure within the laboratory is positive, then the operators may wait till the negative pressure state is achieved and then start the experiments.

Advantageously, the pressure sensing device and pressure indicator 101 provides both electronic and mechanical indications of pressure. Mechanical indications or provided by the state of the membrane 204 and electronic states are provided by the use of light colors and symbols. In this way an operator can quickly observe a discrepancy if the mechanical and light indications and sensing indicates different states. Further, the use of both electronic and mechanical indications provides a combination of readily ascertainable pressure states that are easily vied by occupants.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for sensing air pressure and indication of the air pressure within an enclosed space, the system comprising:
   a housing having an opening;
   an elastomeric membrane covering the opening of the housing and capable of flexing inwards and outwards during a pressure change of the enclosed space;
   a light source disposed within the housing to provide an illumination indicating a positive pressure with a first color and indicating a negative pressure with a second color;
   a projector housed within the housing for projecting a positive pressure symbol and a negative pressure symbol;
   wherein the elastomeric membrane flexes inwards along with a representation of the positive pressure symbol with the illumination of the first color when the pressure within the enclosed space is positive and the elastomeric membrane flexes outwards along with a representation of the negative pressure symbol with the illumination of the second color when the pressure within the enclosed space is negative.

2. The system of claim 1, wherein the housing is made from materials comprising one or more of metals, glasses, and plastics.

3. The system of claim 1, comprising a plurality of electronic devices comprising:
   a digital pressure sensor for measuring the pressure within the enclosed space; and
   a speaker for reading out the measured pressure within the enclosed space.

4. The system of claim 1, wherein the elastomeric membrane flexes due to pressure difference between the enclosed space and a material of the elastomeric membrane is selected based on a particular pressure threshold.

5. The system of claim 1, wherein the elastomeric membrane is made from a translucent material.

6. The system of claim 1, wherein the positive pressure symbol comprises either of a plus mark or a tick mark.

7. The system of claim 1, wherein the negative pressure symbol comprises either of a minus mark or a cross mark.

8. The system of claim 1, wherein the elastomeric membrane remains in a non-flexed position when the pressure within the enclosed space is neutral.

9. A pressure sensing and indicating method for an enclosed space, the method comprising:
   sensing pressure with a pressure sensing device and pressure indicator within the enclosed space and reading out the pressure via a speaker;
   flexing an elastomeric membrane held at an opening of a housing toward an inward direction for a positive pressure state of the enclosed space and toward an outward direction for a negative pressure state of the enclosed space;
   illuminating the elastomeric membrane by a first color for the positive pressure state and by a second color for the negative pressure state;
   projecting, on the elastomeric membrane, a positive pressure symbol for the positive pressure state and a negative pressure symbol for the negative pressure state within the enclosed space.

10. The method of claim 9, wherein the elastomeric membrane flexes due to pressure difference between the enclosed space and a material of the elastomeric membrane is selected based on a particular pressure threshold.

11. The method of claim 9, wherein the elastomeric membrane is made from a translucent material.

12. The method of claim 9, wherein the positive pressure symbol comprises either of a plus mark or a tick mark.

13. The method of claim 9, wherein the negative pressure symbol comprises either of a minus mark or a cross mark.

14. The method of claim 9, wherein the elastomeric membrane remains in a non-flexed position when the pressure within the enclosed space is neutral.

15. A system for sensing and indicating air pressure within an enclosed space, the system comprising:
   a housing having an opening;
   an elastomeric membrane covering the opening of the housing and capable of flexing inwards and outwards during a pressure change of the enclosed space;
   a light source disposed within the housing to provide an illumination indicating a positive pressure with a first color and indicating a negative pressure with a second color;
   a projector housed within the housing for projecting a positive pressure symbol and a negative pressure symbol;
   wherein the elastomeric membrane flexes inwards along with a representation of the positive pressure symbol with the illumination of the first color when the pressure within the enclosed space is positive and the elastomeric membrane flexes outwards along with a representation of the negative pressure symbol with the illumination of the second color when the pressure within the enclosed space is negative.

16. The system of claim 15, wherein the elastomeric membrane flexes due to pressure difference between the enclosed space and the material of the elastomeric membrane is selected based on a particular pressure threshold.

17. The system of claim 15, wherein the elastomeric membrane is made from a translucent material.

18. The system of claim 15, wherein the positive pressure symbol comprises either of a plus mark or a tick mark.

19. The system of claim 15, wherein the negative pressure symbol comprises either of a minus mark or a cross mark.

20. The system of claim 15, wherein the elastomeric membrane remains in a non-flexed position when the pressure within the enclosed space is neutral.

* * * * *